Patented Feb. 8, 1949

2,461,154

UNITED STATES PATENT OFFICE 2,461,154

BENZILIC ACID SOLDERING FLUX

Thomas Alton Hale, Rochester, N. Y., assignor to Eastman Kodak Company, Rochester, N. Y., a corporation of New Jersey No Drawing. Application July 31, 1945
Serial No. 608,080

5 Claims. (Cl. 148—25)

This invention relates to soldering fluxes and more particularly to a soldering flux which is completely non-corrosive and electrically non-conductive.

In the final assembly of electronic equipment such as radio, radar, sound detectors, fire control, etc. in which solder is employed to join together very small parts such as fine wires, contacts, etc., it is extremely important that the residue of any soldering flux used should be not only completely non-corrosive and electrically non-conductive but also that any fumes from the flux during the soldering operation should be equally harmless to all of the parts with which they may come into contact.

While rosin has been known as a universal soldering flux and can qualify in all three of the respects recited above, the fluxing (pickling) action of the rosin is slow and frequently results in a bond which is not so strong as would be produced by a more active flux.

It is, therefore, an object of my invention to provide a soldering flux which is completely non-corrosive and electrically non-conductive and which flux at the same time will produce a strong soldered bond between two parts made of different metals or between two parts made of the same metal.

I have found that benzilic acid, which has the formula $(C_6H_5)_2COH.COOH$, fulfills these requirements admirably. Benzilic acid has a melting point below the melting point of the usual soldering alloy, is substantially insoluble in water at room temperatures but is soluble in alcohol. Thus, benzilic acid will flow readily at soldering temperatures, protects the soldered joint against moisture penetration, does not decompose at soldering temperatures nor hydrolyze in the presence of moisture but can be removed from the soldered joint by the use of alcohol if it is desired. In addition it produces a very strong jointure or bond between two pieces of different metals which are being soldered or between two pieces of the same metal, such as copper, tin, lead, silver and various alloys thereof. As is well known, the usual solder is an alloy of lead and tin; however, my invention is useful not only with the usual solder but with special solders such as others of the fusible alloy class.

Since benzilic acid is a solid at atmospheric temperatures, it does not spread well over the area being soldered until it is heated to its melting point; hence it is more useful as a soldering flux if mixed with other suitable components.

Since rosin makes a good protective coating for any soldered joint and is completely non-corrosive and electrically non-conductive and is compatible with benzilic acid, I have found that even a more useful soldering flux can be produced by dissolving rosin and benzilic acid together by means of a high boiling common solvent, such as cyclohexanol, butyl alcohol or similar suitable high boiling solvent. A more or less high boiling solvent is preferable, depending upon the consistency desired for the final product, but the product may be made up originally or may be thinned by the use of turpentine or methyl, ethyl, or isopropyl alcohol. By making into a heavy paste, the flux may be included in the core of hollow wire solder in the same form that straight rosin flux has heretofore been used.

A typical flux in accordance with my invention may be compounded as follows:

| | Parts by weight |
|---|---|
| Benzilic acid | 1 |
| Rosin W. W. | 1 |
| Cyclohexanol | 3 |

A somewhat more liquid flux embodying my invention may be compounded as follows:

| | Parts by weight |
|---|---|
| Benzilic acid | 1 |
| Rosin W. W. | 3 |
| Cyclohexanol | 6 |

A still more liquid form of flux embodying my invention may be compounded by adding one part of methyl, ethyl, or isopropyl alcohol to either of the formulae above recited.

In using the flux of my invention it will be found that excessive heat is not required or even desired to form a strongly bonded jointure of the solder with the metallic parts being joined, that the flux is completely non-corrosive even under accelerated (warm, humid) corrosive conditions, and that the flux is also electrically non-conductive and that no fumes are formed during the soldering operation which will corrode the parts or cause electrical conduction where it is not desired.

I claim:

1. A non-corrosive and electrically non-conductive soldering flux consisting of equal parts by weight of benzilic acid and rosin, dissolved in a common solvent.

2. A non-corrosive and electrically non-conductive soldering flux consisting of equal parts by weight of benzilic acid and rosin, dissolved in a high boiling common solvent.

3. A non-corrosive and electrically non-conductive soldering flux consisting of 1 to 3 parts by weight of rosin and 1 part by weight of benzilic acid dissolved in a common solvent.

4. A non-corrosive and electrically non-conductive soldering flux consisting of 1 to 3 parts by weight of rosin and 1 part by weight of benzilic acid dissolved in a high boiling common solvent.

5. A non-corrosive and electrically non-conductive soldering flux consisting of 1 to 3 parts by weight of rosin and 1 part by weight of benzilic acid dissolved in cyclohexanol.

THOMAS ALTON HALE.

REFERENCES CITED

The following references are of record in the file of this patent:

UNITED STATES PATENTS

| Number | Name | Date |
|---|---|---|
| 1,859,651 | Bowers | May 24, 1932 |
| 2,361,867 | Pessel | Oct. 31, 1944 |

FOREIGN PATENTS

| Number | Country | Date |
|---|---|---|
| 471,202 | Great Britain | Aug. 31, 1937 |

OTHER REFERENCES

"Handbook of Chemistry and Physics," 26th edition (1942), published by Chemical Rubber Publishing Company, Cleveland, Ohio, pages 628–629 and 858–859.